Figure 4:
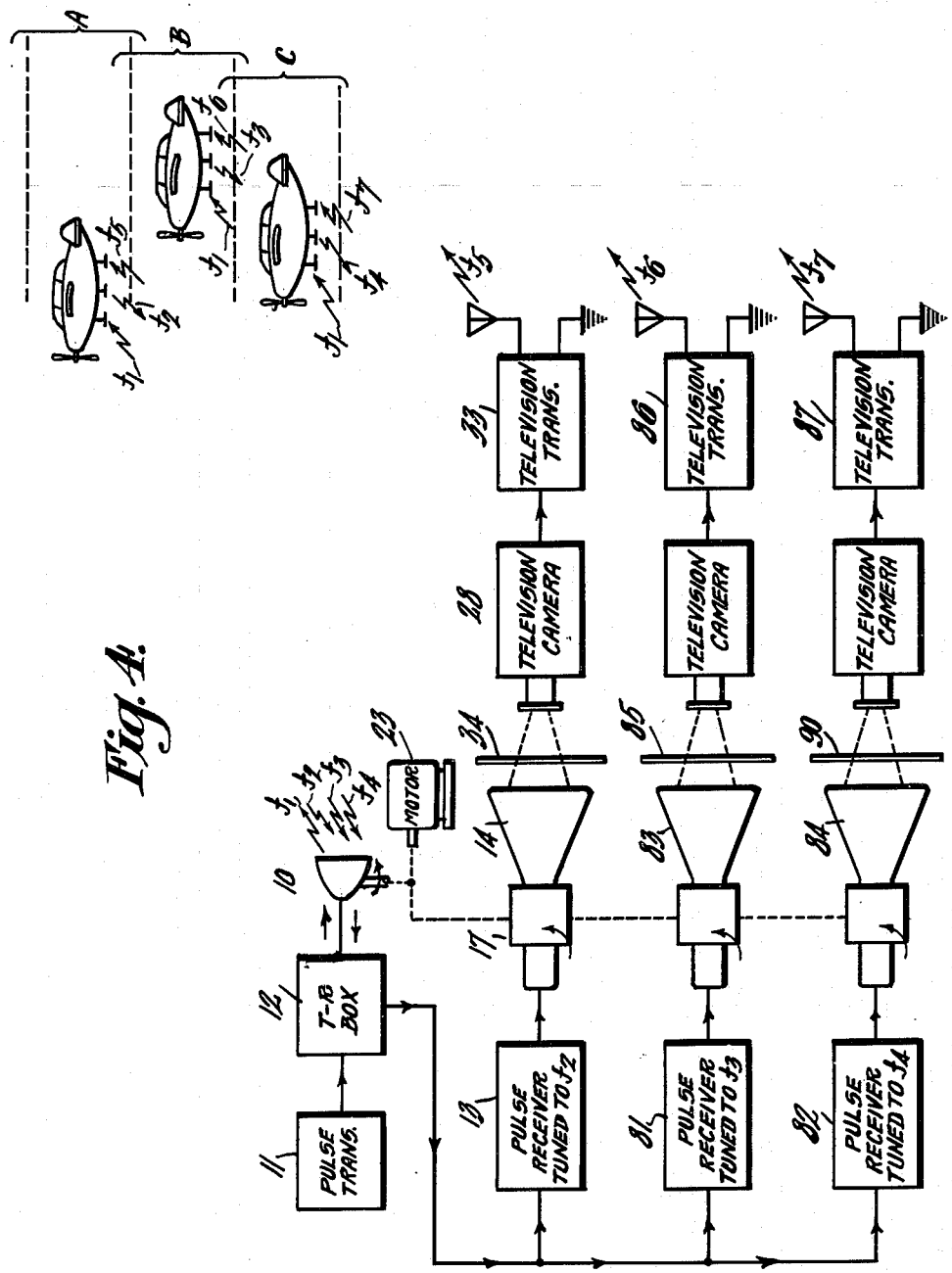

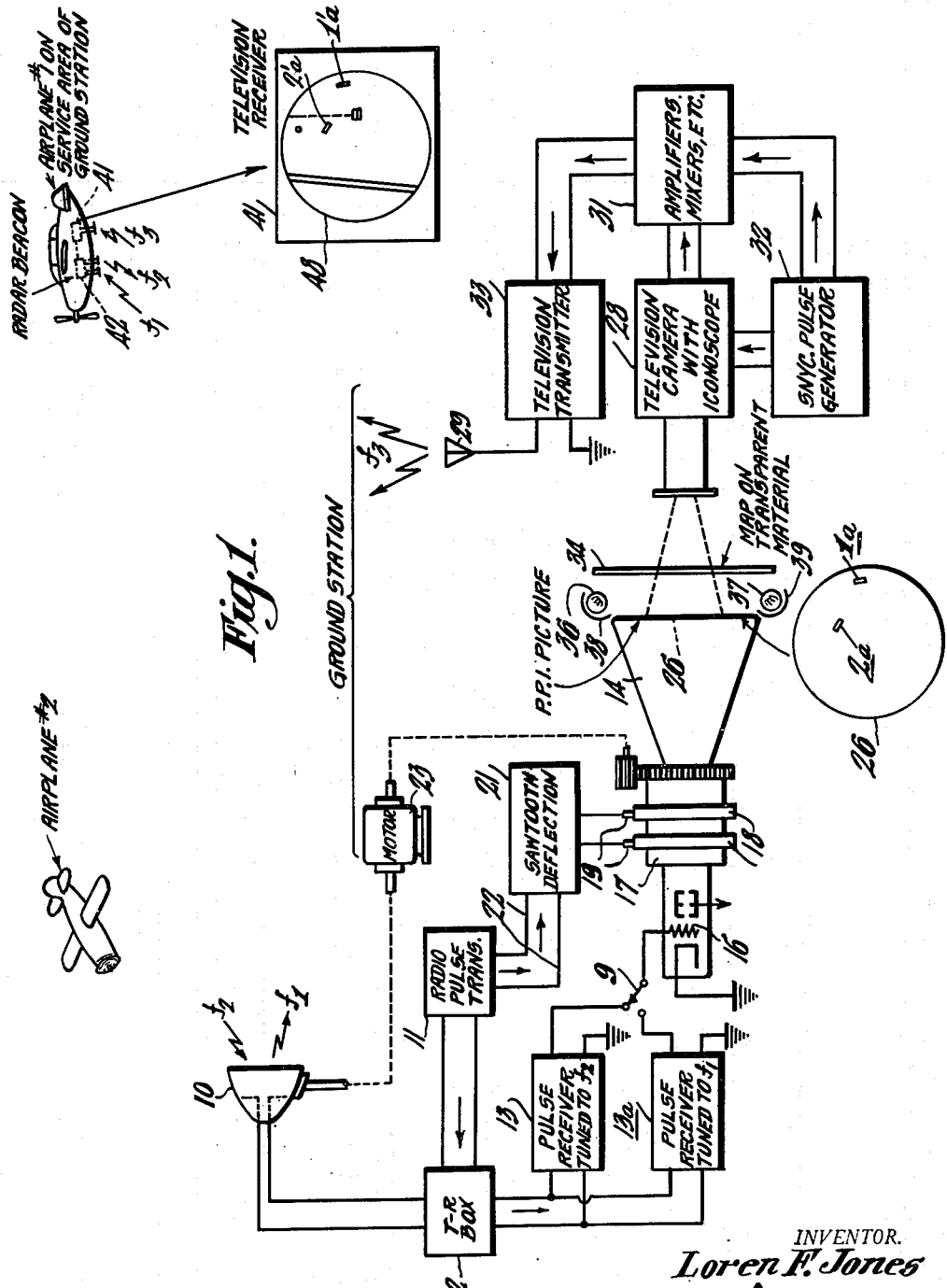

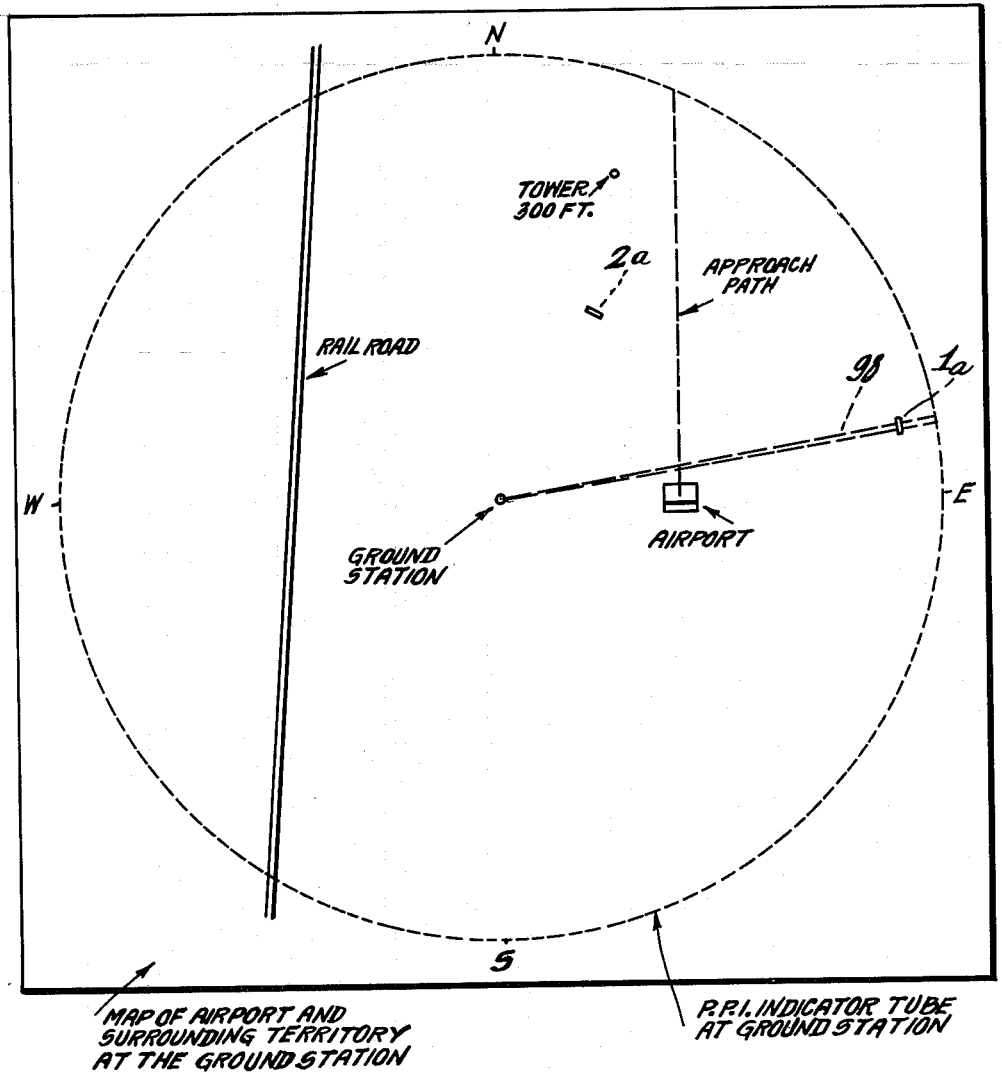

March 17, 1953     L. F. JONES     2,632,157

RADIO NAVIGATION SYSTEM

Filed July 31, 1945     4 Sheets-Sheet 3

INVENTOR.
*Loren F. Jones*
BY
*ATTORNEY*

March 17, 1953  L. F. JONES  2,632,157
RADIO NAVIGATION SYSTEM
Filed July 31, 1945  4 Sheets-Sheet 4

INVENTOR.
Loren F. Jones
BY
ATTORNEY

Patented Mar. 17, 1953

2,632,157

UNITED STATES PATENT OFFICE 2,632,157

RADIO NAVIGATION SYSTEM

Loren F. Jones, Philadelphia, Pa., assignor to Radio Corporation of America, a corporation of Delaware Application July 31, 1945, Serial No. 607,999½

31 Claims. (Cl. 343—6)

My invention relates to radio navigation systems and particularly to systems for ship or aircraft navigation wherein the ship or aircraft receives information from a radar system on the ground.

An object of the invention is to provide an improved radio navigation system.

A further object of the invention is to provide an improved method of and means for enabling a pilot or navigator in an aircraft to see his position with respect to the ground regardless of poor visibility.

A further object of the invention is to provide an improved navigation system that comprises a radar system and a television system in combination.

A still further object of the invention is to provide an improved method of and means for identifying the aircraft appearing in a P. P. I. picture received at said aircraft.

In accordance with my invention the navigation system comprises a radar system such as a plan position indicator system (P. P. I. system) on the ground and a television transmitter for transmitting the P. P. I. view of ships or aircraft within the service area of the P. P. I. and television stations to said aircraft. Each ship or aircraft carries a television receiver and preferably a radar beacon or retransmitter, also. Usually, it is desirable that a map be superimposed on the P. P. I. view so that the resulting composite picture is transmitted by the television transmitter.

In practicing one embodiment of the invention the ground station comprises a P. P. I. system which radiates radio pulses from a directional antenna that is continuously rotated through 360 degrees to search for ships or aircraft within the service area. A cathode ray indicator tube is provided with a deflecting yoke that is rotated in synchronism with the antenna, and the cathode ray is simultaneously deflected radially at a comparatively rapid rate in synchronism with the pulse transmission. Thus the cathode ray scans in polar co-ordinates. Radio pulses reflected or retransmitted from said ships or aircraft are picked up by said antenna and caused to modulate the cathode ray. Thus there appears on the cathode ray screen a view, referred to hereinafter as a P. P. I. picture, wherein a spot on the screen corresponds to a particular ship or aircraft, and wherein the craft's position with respect to the P. P. I. antenna is shown.

This P. P. I. picture is transmitted by a television transmitter so that it may be received by any ship or aircraft within the service area that is equipped with a television receiver. Since the P. P. I. picture may show a plurality of craft in the service area, some identification method or means must be provided to show a pilot or navigator which one of the spots in the picture he is viewing is the one corresponding to his craft.

One way of obtaining such identification is to provide the transmitter of the radar beacon on the ship or aircraft with means for increasing its power output, or interrupting its output, in response to actuation of an identification button or switch. When a pilot or navigator pushes this button, the spot in the P. P. I. picture corresponding to his craft will become brighter, or will disappear, thus identifying his craft.

Another way of obtaining the desired identification is to provide means for automatically brightening the P. P. I. picture at the ship or aircraft at the instant that a rotating strobe line in the picture is pointing to the spot corresponding to said craft. This identification scheme is described and claimed in application Serial No. 613,509, filed August 30, 1945, in the name of Irving Wolff and entitled Radio Navigation System, now Patent No. 2,528,202, issued October 31, 1950. One feature of the present invention is an improvement in the identification means described in the said Wolff application.

The invention will be better understood from the following description taken in connection with the accompanying drawing in which Figure 1 is a block diagram illustrating one embodiment of the invention, Figure 2 is a view of a portion of the system shown in Fig. 1 wherein a map is superimposed on a P. P. I. view, Figure 3 is a block diagram of a system that may be carried by an aircraft which is to use the ground station of Fig. 1 for navigation, Figure 4 is a block diagram of a system employing a plurality of frequency channels similar to that shown in Fig. 1, Figure 5 is a view partly in perspective and partly in block diagram showing improved ground station apparatus for producing a strobe line in the P. P. I. picture for identification purposes, and Figure 6 is a group of graphs that are referred to in explaining the way in which the identification apparatus of Fig. 5 is used.

In the several figures, similar parts are indicated by similar reference characters.

Referring to Fig. 1, the ground station comprises a radar system of the P. P. I. type which includes a rotatable directive antenna 10, a radio pulse transmitter 11 which is coupled to the antenna 10 through a transmit-receive or T-R box 12 that functions as an antenna duplexer as is well known in the art. Reflected or retransmitted pulses are received by the antenna 10 and supplied through the T-R box 12 to two radio pulse receivers 13 and 13a.

The cathode ray indicator tube 14 may be of conventional design having a control grid 16 to which pulses from either the receiver 13 or the receiver 13a are applied. The cathode ray is deflected radially by means of a deflecting yoke 17 comprising a pair of deflecting coils and provided with conductor rings 18 and brushes 19 whereby the yoke 17 may be rotated during the radial deflection. A sawtooth deflecting wave is supplied to the deflecting yoke 17 from a sawtooth deflection circuit 21 which is synchronized with the pulse transmission by means of pulses supplied over conductors 22.

A motor 23 is mechanically coupled to the antenna 10 and to the yoke 17 for rotating them in synchronism at some rate such as one rotation every six seconds.

The cathode ray tube 14 is provided with a phosphorescent screen 26 having long persistence so that it stores the received position information. Light spots appear on the screen 26, as shown at 1a and 2a, which correspond to the aircraft that reflect or retransmit the radio pulses. Two such aircraft, which are indicated as airplane No. 1 and airplane No. 2, are illustrated. The spot 1a in the P. P. I. picture corresponds to airplane No. 1, the distance of the spot from the center of the picture showing the distance from the radar station to the airplane No. 1, and the angular position of the spot showing the azimuth of the airplane with respect to the radar station. Similarly, the spot 2a corresponds to the airplane No. 2.

The P. P. I. picture on the screen 26 is picked up by a television camera 28 of a conventional type such as one including an iconoscope or orthicon or image orthicon and is transmitted from an antenna 29 which, in the present example, is non-directive. The television transmitting system is of conventional design and comprises, in addition to the television camera 28, suitable amplifiers and mixers indicated at 31, a synchronizing pulse generator 32 that supplies synchronizing signal to the horizontal and vertical deflecting circuits of the camera 28, where the scanning is in rectangular co-ordinates, and to the amplifiers and mixers 31, and a radio transmitter 33 that transmits a carrier wave modulated by the usual mixture of picture and synchronizing signals.

A map 34 of the territory surrounding the ground station, or a chart showing other information, preferably is superimposed on the P. P. I. picture and transmitted therewith. The map may be drawn on transparent material and is suitably illuminated as by means of lamps 36 and 37 which are provided with reflectors 38 and 39, respectively. The map may have landing instructions or other information such as wind direction written on it. The map and/or other information drawn on said transparent material may be referred to as an information display.

Fig. 2 shows one example of a map superimposed on a P. P. I. picture, and it is assumed that it is this combined picture that is received by the television receivers in airplanes No. 1 and No. 2 (Fig. 1). In the example assumed, the diameter of the P. P. I. picture corresponds to about 30 miles. The ground station is located about 6 miles west of an airport and is used, in the example being described, to enable pilots to bring their aircraft to the airport after they have reached its general vicinity by the aid of other navigation equipment. If a blind landing is to be made, other equipment for this purpose should be provided.

It will be understood that the type of system being described may be employed for cross-country navigation to aid pilots in reaching the vicinity of the desired airport. For this use it is desirable to employ radar and television transmitters of greater power, of sufficient power, for example, to service an area having a 50 mile radius.

Referring now to the aircraft equipment, each aircraft is provided, as indicated at airplane No. 1 (Fig. 1), with a television receiver 41 and preferably is also provided with a radar beacon 42. This equipment is shown in more detail in Fig. 3 and will be described with reference to Fig. 3 hereinafter. As illustrated in Fig. 1, the airplane No. 1 (as well as airplane No. 2 and others suitably equipped) receives a picture that is a duplicate of the combined P. P. I. and map view shown in Fig. 2. The spots 1'a and 2'a in the received picture correspond to the spots 1a and 2a, respectively, on the P. P. I. screen 26. Therefore, the pilot of airplane No. 1 can see his location with respect to the airport and with respect to anything else shown on the map, providing he can determine what spot in the P. P. I. picture corresponds to his airplane No. 1. Two ways of obtaining such aircraft identification will now be described.

Referring to Fig. 3, the television receiver 41 is of conventional design and comprises a radio receiver portion 46, a video frequency amplifier 47, and a cathode ray tube 48. The tube 48 has a screen 50 of phosphorescent material that has short persistence the same as in the usual television receiver. Sawtooth waves for horizontal and vertical deflection are supplied through conductor rings $a$, $b$, $c$ and $d$ to a rotatable deflecting yoke 49 from deflecting circuits indicated at 51. The deflection circuits 51 are synchronized by synchronizing pulses supplied from a synchronizing pulse separating circuit 52. Thus the screen 50 is scanned in rectangular co-ordinates in synchronism with the rectangular co-ordinates scanning at the television camera.

The deflecting yoke 49 need not be rotatable but, as illustrated, it may be desirable to keep the picture of the map and the P. P. I. indications, which appear on the end of the tube 48, oriented by coupling the yoke 49 through gears to a directional gyro.

The video amplifier output is applied to the control grid 53 of the cathode ray tube 48, the grid circuit including the secondary of a transformer 54 in the example illustrated. The transformer 54 is provided for applying a positive pulse 56 to the grid 53 for identification purposes as explained hereinafter in connection with one embodiment of the invention. It will be understood that the pulse 56 may be applied to the grid 53 by other circuit means than the transformer 54 if desired.

The radar beacon 42 comprises a radio pulse receiver 57 which receives and demodulates the radar pulses transmitted from the ground station on a carrier wave frequency $f_1$. The modulated pulses are applied through a delay line or network 58 to a radio pulse transmitter 59 operating on a carrier wave frequency $f_2$. The delayed pulses modulate the transmitter 59 whereby the received pulses are retransmitted at the carrier frequency $f_2$. Both the delay introduced by network 58 and the difference in the frequencies $f_1$ and $f_2$ are utilized to prevent "singing" of the beacon circuit.

To enable a pilot to identify his own aircraft in the received P. P. I. picture, a switch 55 actuated by a switch button 55a is provided on the beacon transmitter 59. When the switch 55 is closed, the power output of the transmitter 59 is increased. This power increase may be the result of applying a higher voltage to the plate of the transmitter oscillator, for example, in response to closing of the switch 55. The resulting increase in the brightness of the spot produced by the retransmission from the transmitter 59 identifies this particular spot as the one corresponding to the aircraft carrying said transmitter.

Before describing my improvement in the second method of identification, reference will be made to Fig. 4 showing a navigation system in which an aircraft flying at a certain altitude level receives at any one time a picture containing only aircraft flying at the same level or at one of the other preassigned levels. Thus a pilot may see a view of the aircraft at his level only or may check to see what aircraft are above his level or below his level.

In Fig. 4, the above-described altitude identification is obtained by the use of different operational channels such as different frequency channels for different preassigned flight levels. Three aircraft are shown at three slightly overlapping flight levels A, B and C. The radar beacons in the aircraft at levels A, B and C retransmit at carrier frequencies $f_2$, $f_3$ and $f_4$, respectively.

At the ground station three pulse receivers 13, 81 and 82 are tuned to the three carrier frequencies $f_2$, $f_3$ and $f_4$, respectively, and their outputs are applied to the cathode ray tubes 14, 83 and 84, respectively. The resulting P. P. I. picture on the tube 14 shows the aircraft at the level A, and this picture and a map 34 are transmitted on a carrier wave of frequency $f_5$ by the television transmitter 33 to the aircraft at the level A, the aircraft at this level having their television receivers tuned to the frequency $f_5$.

Similarly, the P. P. I. pictures on the cathode ray tubes 83 and 84 show the aircraft at levels B and C, respectively, and these pictures and maps 85 and 90 are transmitted by the television transmitters 86 and 87, respectively, on the carrier waves at frequencies $f_6$ and $f_7$ to the aircraft at the levels B and C. The aircraft at levels B and C have their television receivers tuned to the frequencies $f_6$ and $f_7$, respectively. At each aircraft a check can be made on the aircraft in an adjacent flight level by tuning the television receiver in the aircraft to the television carrier frequency assigned to said flight level. The radar beacon transmitter frequency is changed only when the aircraft carrying the beacon moves into a different flight level. This may be done automatically as illustrated in Fig. 3.

Referring to Fig. 3, the aircraft carries an altimeter 91, such as one of the barometric type, which has a shaft 92 that assumes an angular position as a function of altitude. The altimeter shaft 92 is mechanically coupled to tuning shafts 93 and 94 on the beacon transmitter and the television receiver, respectively. As the tuning shafts 93 and 94 are rotated to different positions, they tune the beacon transmitter and the television receiver in preassigned frequency steps so that they are operating in the proper frequency channel for the altitude level in which the aircraft carrying them is located.

For the purpose of identification according to the method described in the above-identified Wolff application, demodulated pulses from the beacon receiver 57 may be applied through conductors 61 and a switch 60 to an integration circuit 62 whereby the integrated pulse 56 is obtained. The pulse 56 is the integrated energy of the group of radar pulses that appear in the output of the receiver 57 during the interval that the P. P. I. radio beam sweeps past the aircraft carrying the equipment 41—42.

The integrated pulse 56 is applied through the transformer 54 to the control grid 53 of the cathode ray tube with positive polarity. As a result, the electron beam intensity is increased while the pulse 56 is on the grid 53. This, of course, is also the time the beacon transmitter 59 is retransmitting and/or reflecting pulses to the P. P. I. ground station to produce a spot on the P. P. I. picture corresponding to the aircraft carrying said beacon. This is also the time that a rotating strobe line is pointing to said spot as will be explained in connection with Fig. 5. It follows that the pulse 56 causes the P. P. I. picture on the tube 48 to brighten up only while the strobe line is pointing to the spot corresponding to the aircraft to be identified whereby the pilot can readily identify his own aircraft.

As explained in the above-mentioned Wolff application, a rotating strobe line is visible in the usual P. P. I. system because of the presence of noise signal provided the gain of the P. P. I. receiver is not turned down too low. However, it may be desirable to operate the P. P. I. receiver at sufficiently low gain so that a strobe line resulting from noise does not appear, particularly when strong signals are received from radar beacons. Therefore, I have provided means to introduce a rotating strobe line that is always visible regardless of the receiver gain setting.

Referring to Fig. 5, a television camera 96 is provided for electrically mixing the picture of the map 34 with the P. P. I. picture of the tube 14, the signals representative of the two pictures being combined in a mixing circuit 97. A strobe line 98 is projected upon the map 34 or upon the table top 99 supporting the map. It will be understood that either the map 34 or the table top 99 should be translucent to act as a projection screen, the other preferably being transparent.

The rotating strobe line 98 may be obtained by illuminating a slit 101 in a disc 102 and projecting an image of the slit 101 upon the map 34 by means of a lens 103. The slit 101 may be illuminated by a lamp indicated at 104. The disc 102 may be mounted on a shaft 106 that is rotatably supported by a supporting structure 107. The motor 23 drives the disc 102 through gears 108 to rotate the slit 101 and the corresponding strobe line 98 in synchronism with the rotation of the deflecting yoke 17.

In Fig. 2, the strobe line 98 is indicated by dotted lines and in the position that it is in when the integrated pulse 56 brightens the received picture in the aircraft corresponding to the spot 1a.

In the aircraft No. 2 corresponding to the spot 2a, the received picture at said aircraft will brighten up at the instant the strobe line 98 is pointing to the spot 2a, thus identifying aircraft No. 2 in the picture.

When employing the strobe line 98 for identification, the system is preferably operated with the relative illuminations or amplitudes of modulation illustrated in Fig. 6. The P. P. I. spots produce the greatest amplitude of modulation on the television transmitter carrier wave, the map produces an intermediate amount of modulation on said carrier wave, and the strobe line 98 produces the least amount of modulation on said carrier wave. The cathode ray tube bias at the aircraft receiver is adjusted, as by means of a bias tap 111 (Fig. 3), so that in the absence of the pulse 56 the beam cut-off level is such that the cathode ray is not modulated by the strobe line signal. As a result, only the P. P. I. spots and the map are visible on the tube 48, and the P. P. I. spots are brighter than the map so that they can be seen readily.

However, as soon as the P. P. I. radio beam sweeps past the aircraft, the pulse 56 is produced and the negative bias on the grid 53 is reduced to a level that permits the strobe line signal to modulate the cathode ray, thus making the strobe line visible in the picture on the tube 48.

It will be understood that the bias tap 111 may be set so that the strobe line is visible at all times and will be seen rotating in synchronism with the P. P. I. antenna and the P. P. I. deflecting yoke. This may be desirable, but the presence of the strobe line may tend to obscure some of the P. P. I. spots.

Note may be made of the fact that it may be advantageous to make the screens of the P. P. I. cathode ray tubes, of tube 14, for example, of phosphorescent material having unusually long persistence such as a persistence of one or two minutes. The advantage of this is that a P. P. I. spot will then leave a trail behind it on the screen. This trail will indicate the direction of travel of the aircraft corresponding to the spot so that a pilot can tell whether another aircraft is moving toward or away from him.

In practicing the invention where a strobe line is used for identification, it is not essential that the aircraft be equipped with radar beacons or retransmitters since the P. P. I. picture may be obtained by pulses reflected from the surface of the aircraft and since only a radio receiver is required on the aircraft for obtaining the identification pulse 56.

As shown in Fig. 1, two receivers 13 and 13a may be provided which are tuned to the beacon transmitter frequency $f_2$ and to the radar transmitter frequency $f_1$, respectively. By means of a switch 9, the cathode ray tube 14 may be connected to the receiver 13 when it is desired to obtain a P. P. I. picture that is produced by the radar beacons, or it may be connected to the receiver 13a when it is desired to obtain a P. P. I. picture that is produced by direct reflection of the radar pulses. In the latter case, the navigation system may be operated without radar beacons on the aircraft and with strobe line identification.

It should be understood that in the claims the term "echo" applies to pulses returned from a craft whether by direct reflection or by retransmission by means of a radar beacon.

I claim as my invention:

1. A navigation system for craft within the service area of a ground station, said system comprising a ground station which includes a radar system for obtaining the distance and azimuth of each of said craft and which further includes means for transmitting said distance and azimuth information to said craft, television transmitting means for also transmitting to said craft a map of at least a portion of said service area, receiving means carried by each of said craft for receiving said map and said distance and azimuth information, means carried by each of said craft for reproducing said map and said distance and azimuth information as a picture having spots superimposed on said map showing the positions of said craft on said map, and means for identifying at a craft the particular spot among the plurality of spots in said picture which corresponds to said last-mentioned craft.

2. A navigation system for craft within the service area of a ground station, said system comprising a ground station which includes a radar system for obtaining the distance and azimuth of each of said craft and for producing a picture having spots therein located in accordance with said distance and azimuth information and showing the positions of said craft, television transmitting means for transmitting said picture to said craft, a television receiver carried by each of said craft for receiving said transmitted picture and for reproducing said picture as one having spots therein showing the positions of said craft with respect to said ground station, and means for identifying at a craft the particular spot among the plurality of spots in said picture which corresponds to said craft.

3. A navigation system for craft within the service area of a ground station, said system comprising a ground station which includes a radar system for obtaining the distance and azimuth of each of said craft and for producing a picture having spots therein located in accordance with said distance and azimuth information and showing the positions of said craft, television transmitting means for transmitting said picture and for also transmitting to said craft a map of at least a portion of said service area, a television receiver carried by each of said craft for receiving said transmitted picture and map and for reproducing said picture and said map as a composite picture having spots superimposed on said map showing the positions of said craft on said map, and means for identifying at a craft the particular spot among the plurality of spots in said composite picture which corresponds to said craft.

4. A navigation system for craft within the service area of a ground station, said system comprising a ground station which includes a radar system of the plan position indicator type for producing a picture having spots therein showing the positions of said craft and which further includes a television transmitter for transmitting said picture to said craft, a television receiver carried by each of said craft for receiving said picture, a radar beacon also carried by each of said craft for receiving and retransmitting signals transmitted by said radar system, and means for identifying at a craft the particular spot among the plurality of spots in the received television picture which corresponds to said last-mentioned craft.

5. A navigation system for craft located within the service area of a ground station, said system comprising a ground station which includes a radar system of the plan position indicator type for producing a picture having spots therein showing the positions of said craft and which further includes a television transmitter for transmitting said picture to said craft, said radar system including means for scanning said service area by a directional radio beam, a television receiver carried by each of said craft for receiving said picture, a radar beacon also carried by each of said craft for receiving and retransmitting signals transmitted by said radar system, and means for changing the power output of the radar beacon in the craft carrying said television receiver for changing momentarily the brightness of that spot in the received television picture which corresponds to said last-mentioned craft.

6. A navigation system for craft within the service area of a ground station, said system comprising a ground station which includes a radar system of the plan position indicator type for producing a picture containing spots showing the positions of said craft and which further includes a television transmitter for transmitting said picture to said craft, said radar system including means for scanning said service area by a directional radio beam, means for producing independently of said picture a radial marker line that angularly rotates about a point near one of its ends in synchronism with said radio beam, means for producing signals representative of said marker line, means for producing signals representative of said picture, means for mixing said marker line signals with said picture signals for transmission therewith, a television receiver carried by each of said craft for receiving said picture and marker line signals for reproducing said picture and said marker line, a radar beacon also carried by each of said craft for receiving and retransmitting signals transmitted by said radar system, and means for changing momentarily the brilliance of said reproduced picture at a craft in response to said radio beam pointing toward it whereby said marker line is pointing to the spot which corresponds to said last-mentioned craft at the moment of said changed picture brilliance.

7. The invention according to claim 6 wherein said marker line is transmitted from the ground station at a lower modulation level of the carrier wave than is said picture and wherein means is provided for the transmitting of map information at a modulation level of said carrier wave intermediate that of said marker line modulation and said picture modulation.

8. A navigation system for craft within the service area of a ground station, said system comprising a ground station which includes a radar system of the plan position indicator type for producing a picture containing spots showing the positions of said craft and which further includes a television transmitter for transmitting said picture to said craft, said radar system including means for scanning said service area by a directional radio beam, means for producing independently of said picture a radial marker line that angularly rotates about a point near one of its ends in synchronism with said radio beam, means for producing signals representative of said marker line, means for producing signals representative of said picture, means for mixing said marker line signals with said picture signals for transmission therewith, a television receiver carried by each of said craft for receiving said picture and marker line signals, said television receiver including a cathode ray tube and horizontal and vertical deflecting circuits therefor for reproducing said picture and said marker line, a radar beacon also carried by each of said craft for receiving and retransmitting signals transmitted by said radar system, and means for changing momentarily the brilliance of said reproduced picture at a craft in response to said radio beam pointing toward it whereby said marker line is pointing to the spot which corresponds to said last-mentioned craft at the moment of said changed picture brilliance.

9. The invention according to claim 8 wherein said marker line is transmitted from the ground station at a lower modulation level than is said picture and wherein the cathode ray tube in said television receiver is biased so that said marker line is visible in said reproduced picture only in response to said radio beam pointing toward the craft carrying said television receiver.

10. In an aircraft navigation system for aircraft that are to fly in preassigned altitude layers, a ground station comprising a radar system, a radar beacon carried by each of said aircraft, said beacon including means for retransmitting radar signals from said beacon to said ground radar system on separate channels for said altitude layers, respectively, said radar system comprising means for obtaining information as to the distance and the azimuth of each of said aircraft, transmitting means for transmitting said information to said aircraft, receiving means carried by each of said aircraft for receiving said distance and azimuth information and for producing a picture having spots therein located in accordance with said distance and azimuth information and showing the positions of said aircraft, said transmitting means including means for transmitting on separate frequency channels to the aircraft in said different altitude layers, respectively, the information that was retransmitted on said separate channels, respectively.

11. The system according to claim 10 wherein means including an altimeter is carried by each of said aircraft for changing the channel on which said beacon retransmitting means of the aircraft retransmits and for also changing the tuning of the television receiver on the aircraft in response to said aircraft flying from one of said altitude layers to a different altitude layer.

12. In an aircraft navigation system for aircraft that are to fly in preassigned altitude layers, a ground station comprising a radar system for obtaining the distance and azimuth of each of said aircraft and for producing a picture having spots therein located in accordance with said distance and azimuth information and showing the positions of said aircraft, television transmitting means for transmitting said picture to said aircraft, a radar beacon and a television receiver carried by each of said aircraft, said beacon including means for retransmitting radar signals from said beacon to said ground radar system on separate channels for said altitude layers, respectively, said ground radar system including a separate picture reproducing indicator for each of said altitude layers, and said television system including means for transmitting the pictures appearing on said indicators on separate frequency channels, respectively, to the aircraft in said different altitude layers, respectively.

13. The system according to claim 12 wherein means including an altimeter is carried by each of said aircraft for changing the tuning of the television receiver on an aircraft in response to said aircraft flying from one of said altitude layers to a different altitude layer.

14. In an aircraft navigation system for aircraft that are to fly in preassigned altitude layers, a ground station comprising a radar system of the plan-position-indicator type for producing a picture having spots therein showing the positions of said aircraft with respect to the ground station, a television transmitter system for transmitting said picture to said aircraft, a radar beacon and a television receiver carried by each of said aircraft, means for retransmitting from said beacon on a different carrier frequency assigned to each of said altitude layers, said radar system including a separate pulse receiver and a separate picture reproducing indicator for each of said altitude layers, and said television system including means for transmitting the pictures appearing on each of said indicators on separate channels, respectively, to the aircraft in said different altitude layers, respectively.

15. The system according to claim 14 wherein means including an altimeter is carried by each of said craft for changing the tuning of said beacon retransmitting means and for also changing the tuning of the television receiver on an aircraft in response to said aircraft flying from one of said altitude layers to a different altitude layer.

16. A system for supplying position information to craft within the service area of a ground station which station comprises means for transmitting radio pulses in a directional beam from said station and for receiving echo pulses from said craft, means for scanning said service area by said beam, a cathode ray tube including means for producing a cathode ray, a storage surface, means for causing said cathode ray to scan said surface in polar co-ordinates in synchronism with said pulse transmission and in synchronism with said beam scanning, means for modulating said cathode ray by said received echoes whereby indications representative of said craft are stored on said surface during said scanning, cathode ray means for converting said stored indications into electrical signals by rectangular co-ordinate scanning, means for transmitting said signals to said craft, means at each of said craft for receiving said signals and for visually reproducing said stored indications by rectangular co-ordinate scanning that is synchronous with said converter means scanning, and means for identifying at a craft the particular indication among the plurality of indications in said visual reproduction which corresponds to said craft.

17. A system for supplying position information to craft within the service area of a ground station which station comprises means for transmitting radio pulses in a directional beam from said station and for receiving echo pulses from said craft, means for scanning said service area by said beam, a cathode ray tube including means for producing a cathode ray, a storage surface, means for causing said cathode ray to scan said surface in polar co-ordinates in synchronism with said pulse transmission and in synchronism with said beam scanning, means for modulating said cathode ray by said received echoes whereby indications representative of said craft are stored on said surface during said scanning, cathode ray means for converting said stored indications into electrical signals by rectangular co-ordinate scanning, means for transmitting said signals to said craft, a radar beacon at each of said craft for receiving said radio pulses and for transmitting a reply pulse, means at each of said craft for receiving said signals and for visually reproducing said stored indications by rectangular co-ordinate scanning that is synchronous with said converter means scanning, and means for identifying at a craft the particular indication among the plurality of indications in said visual reproduction which corresponds to said craft.

18. In an aircraft navigation system for aircraft that are to fly in preassigned altitude layers, a ground station comprising a radar system, a radar beacon carried by each of said aircraft, said beacon including means for retransmitting radar signals from said beacon to said ground radar system on separate channels for said altitude layers, respectively, said radar system comprising means for obtaining information as to the distance and the angular position of each of said aircraft, transmitting means for transmitting said information to said aircraft, receiving means carried by each of said aircraft for receiving said distance and angular position information and for producing a picture having spots therein located in accordance with said distance and angular position information and showing the positions of said aircraft, said transmitting means including means for transmitting on separate operational channels to the aircraft in said different altitude layers, respectively, the information that was retransmitted on said separate channels, respectively.

19. The system according to claim 18 wherein means including an altimeter is carried by each of said aircraft for changing the channel on which said beacon retransmitting means of the aircraft retransmits and for also changing the channel on which the television receiver on the aircraft receives in response to said aircraft flying from one of said altitude layers to a different altitude layer.

20. In an aircraft navigation system for aircraft that are to fly in preassigned altitude layers, a ground station comprising a radar system for obtaining the distance and angular position of each of said aircraft and for producing a picture having spots therein located in accordance with said distance and angular position information and showing the positions of said aircraft, television transmitting means for transmitting said picture to said aircraft, a radar beacon and a television receiver carried by each of said aircraft, said beacon including means for retransmitting radar signals from said beacon to said ground radar system on separate operational channels for said altitude layers, respectively, said ground radar system including a separate picture reproducing indicator for each of said altitude layers, and said television system including means for transmitting the pictures appearing on said indicators on separate operational channels, respectively, to the aircraft in said different altitude layers, respectively.

21. The system according to claim 20 wherein means including an altimeter is carried by each of said aircraft for changing the channel on which the television receiver on an aircraft receives in response to said aircraft flying from one of said altitude layers to a different altitude layer.

22. In an aircraft navigation system for aircraft that are to fly in preassigned altitude layers, a ground station comprising a radar system of the plan-position-indicator type for producing a picture having spots therein showing the positions of said aircraft with respect to the ground station, a television transmitter system for transmitting said picture to said aircraft, a radar beacon and a television receiver carried by each of said aircraft, means for retransmitting from said beacon on a different operational channel assigned to each of said altitude layers, said radar system including a separate picture reproducing indicator for each of said altitude layers, and said television system including means for transmitting the pictures appearing on each of said indicators on separate operational channels, respectively, to the aircraft in said different altitude layers, respectively.

23. The system according to claim 22 wherein means including an altimeter is carried by each of said craft for changing the channel on which said beacon retransmitting means transmits and for also changing the channel on which the television receiver on an aircraft receives in response to said aircraft flying from one of said altitude layers to a different altitude layer.

24. A navigation system for craft within the service area of a ground station, said system comprising a ground station which includes a radar system for obtaining the distance and azimuth of each of said craft, said radar system including means for transmitting signals and for receiving said signals after retransmission from a radar beacon, said ground station further including means for transmitting said distance and azimuth information to said craft, a radar beacon carried by each of said craft for receiving and retransmitting signals received from said radar ground station, receiving means carried by each of said craft for receiving said distance and azimuth information, means carried by each of said craft for reproducing said distance and azimuth information as a picture having spots therein showing the positions of said craft with respect to said ground station, and means for identifying at a craft the particular spot among the plurality of spots in said picture which corresponds to said last-mentioned craft, said last means comprising means for changing momentarily the power output of the radar beacon carried by said last-mentioned aircraft.

25. A navigation system for craft within the service area of a ground station, said system comprising a ground station which includes a radar system for obtaining the distance and azimuth of each of said craft and for producing a picture having spots therein located in accordance with said distance and azimuth information and showing the positions of said craft, television transmitting means for transmitting said picture and for also transmitting to said craft a pictorial information display, a television receiver carried by each of said craft for receiving said transmitted picture and display and for reproducing said picture and said display as a composite picture in which said picture and said display are effectively superimposed, and means for identifying at a craft the particular spot among the plurality of spots in said composite picture which corresponds to said craft.

26. In an aircraft navigation system for aircraft that are to fly in pre-assigned altitude layers, a ground station comprising a radar system including means for transmitting radio pulses in a directional beam, a radar beacon carried by each of said aircraft, said beacon including means for receiving said radio pulses and for transmitting a reply pulse from said beacon to said ground radar system with the reply pulse having a characteristic indicating the altitude of the aircraft, said radar system comprising means for obtaining information as to the distance and the angular position of each of said aircraft, said ground station including transmitting means for transmitting said information to said aircraft, receiving means carried by each of said aircraft for receiving said distance and angular position information and for producing a picture having spots therein located in accordance with said distance and angular position information and showing the positions of said aircraft, said last-mentioned transmitting means including means for transmitting distinctive signals to the aircraft for said different altitude layers, respectively, in accordance with said characteristic of said reply pulse.

27. In an aircraft navigation system for aircraft that are to fly in pre-assigned altitude layers, a ground station comprising a radar system including means for transmitting radio pulses in a directional beam, a radar beacon carried by each of said aircraft, said beacon including means for receiving said radio pulses and for transmitting a reply pulse from said beacon to said ground radar system with the reply pulse having a characteristic indicating the altitude of the aircraft, said radar system comprising means for obtaining information as to the distance and the angular position of each of said aircraft, said ground station including transmitting means for transmitting said information to said aircraft, receiving means carried by each of said aircraft for receiving said distance and angular position information and for producing a picture having spots therein located in accordance with said distance and angular position information and showing the positions of said aircraft, said last-mentioned transmitting means including means for transmitting on separate operational channels to the aircraft in said different altitude layers, respectively, in accordance with said characteristic of said reply pulse.

28. The system according to claim 27 wherein means including an altimeter is carried by each of said aircraft for changing the channel on which the receiver on the aircraft receives in response to said aircraft flying from one of said altitude layers to a different altitude layer.

29. The system according to claim 27 wherein means including an altimeter is carried by each of said aircraft for changing said characteristic of said reply pulse which is representative of the aircraft altitude and for also changing the channel on which the receiver on the aircraft receives in response to said aircraft flying from one of said altitude layers to a different altitude layer.

30. A navigation system for craft within the service area of a ground station, said system comprising a ground station which includes a radar system of the plan position indicator type for producing a picture containing spots showing the positions of said craft and which further includes a television transmitter for transmitting said picture to said craft, said radar system including means for scanning said service area by a directional radio beam, means for producing independently of said picture a radial marker line that angularly rotates about a point near one of its ends in synchronism with said radio beam, means for producing signals representative of said marker line, means for producing signals representative of said picture, means for mixing said marker line signals with said picture signals for transmission therewith, a television receiver carried by each of said craft for receiving said picture and marker line signals for reproducing said picture and said marker line as a composite picture, a radar beacon also carried by each of said craft for receiving signals transmitted by said radar system and for transmitting reply signals, and means including said marker line producing means for identifying at a craft the particular indication among the plurality of indications in said composite picture which corresponds to said craft, said last means also including means for indicating when said marker line is pointing toward the spot corresponding to said last-mentioned craft.

31. A navigation system for craft within the service area of a ground station, said system comprising a ground station which includes a radar system of the plan position indicator type for producing a picture containing spots showing the positions of said craft and which further includes a television transmitter for transmitting said picture to said craft, said radar system including means for scanning said service area by a directional radio beam, means for producing independently of said picture a radial marker line that angularly rotates about a point near one of its ends in synchronism with said radio beam, means for producing signals representative of said marker line, means for producing signals representative of said picture, means for mixing said marker line signals with said picture signals for transmission therewith, a television receiver carried by each of said craft for receiving said picture and marker line signals for reproducing said picture and said marker line as a composite picture, and means for changing momentarily the brilliance of at least a portion of said reproduced composite picture at a craft in response to said radio beam pointing toward it whereby said marker line is pointing to the spot which corresponds to said last-mentioned craft at the moment of said changed brilliance.

LOREN F. JONES.

REFERENCES CITED

The following references are of record in the file of this patent:

UNITED STATES PATENTS

| Number | Name | Date |
| --- | --- | --- |
| 2,027,527 | Hammond, Jr. | Jan. 14, 1936 |
| 2,056,216 | Somers | Oct. 6, 1936 |
| 2,304,057 | Schade | Dec. 1, 1942 |
| 2,307,029 | Elm | Jan. 5, 1943 |
| 2,405,238 | Seeley | Aug. 6, 1946 |
| 2,408,848 | Hammond, Jr. | Oct. 8, 1946 |
| 2,412,669 | Bedford | Dec. 17, 1946 |
| 2,428,427 | Longhren | Oct. 7, 1947 |
| 2,433,341 | Busignies | Dec. 30, 1947 |
| 2,468,045 | Deloraine (2) | Apr. 26, 1949 |
| 2,480,123 | Deloraine (1) | Aug. 30, 1949 |
| 2,513,282 | Busignies (2) | July 4, 1950 |
| 2,547,945 | Jenks | Apr. 10, 1951 |